(12) United States Patent
Niesten et al.

(10) Patent No.: US 7,393,465 B2
(45) Date of Patent: Jul. 1, 2008

(54) HYDROPHOBIC POLYOLS OF LOW VISCOSITY

(75) Inventors: Meike Niesten, Köln (DE); Jack Reese, Hurricane, WV (US); Joachim Simon, Düsseldorf (DE); Gerhard Ruttmann, Burscheid (DE)

(73) Assignee: Bayer MaterialScience AG, Leverkusen (DE)

( * ) Notice: Subject to any disclaimer, the term of this patent is extended or adjusted under 35 U.S.C. 154(b) by 420 days.

(21) Appl. No.: 11/065,101

(22) Filed: Feb. 24, 2005

(65) Prior Publication Data

US 2005/0192423 A1 Sep. 1, 2005

(30) Foreign Application Priority Data

Feb. 28, 2004 (DE) ................ 10 2004 009 818

(51) Int. Cl.
*C08G 18/28* (2006.01)
(52) U.S. Cl. ............................ 252/182.25; 252/182.27; 428/423.1; 521/170; 521/172; 521/173; 521/174; 528/49; 528/76; 528/85; 568/629; 568/630; 568/648; 568/780
(58) Field of Classification Search ................ 568/629, 568/630, 648, 780; 521/170, 172, 173, 174; 252/182.25, 182.27; 428/423.1; 528/49, 528/76, 85
See application file for complete search history.

(56) References Cited

U.S. PATENT DOCUMENTS

| | | | | |
|---|---|---|---|---|
| 3,148,167 | A * | 9/1964 | Keplinger, Jr. ............... 523/455 |
| 4,233,194 | A | 11/1980 | Eschwey et al. .......... 260/22 A |
| 4,264,743 | A * | 4/1981 | Maruyama et al. .......... 521/101 |
| 4,385,171 | A | 5/1983 | Schnabel et al. ............ 528/491 |
| 4,837,359 | A | 6/1989 | Woynar et al. ............... 560/335 |
| 4,994,541 | A | 2/1991 | Dell et al. ..................... 528/51 |
| 5,103,045 | A | 4/1992 | Robin et al. ................. 560/335 |
| 5,124,427 | A | 6/1992 | Potter et al. ................... 528/67 |
| 5,208,334 | A | 5/1993 | Potter et al. ................. 544/193 |
| 6,229,054 | B1 * | 5/2001 | Dai et al. ..................... 568/630 |
| 6,765,111 | B1 | 7/2004 | Pedain et al. ................ 560/351 |
| 7,084,103 | B1 * | 8/2006 | Springsted et al. .......... 510/475 |
| 2005/0022445 | A1 * | 2/2005 | Sarin et al. ..................... 44/300 |

FOREIGN PATENT DOCUMENTS

GB 1 101 410 1/1968
WO 92/21741 12/1992

OTHER PUBLICATIONS

Ullmanns Encyclopädie der industriellen Chemie, vol. A21, (month unavailable) 1992, pp. 670-671, "Polyurethanes".
Polyurethanes Chemistry and Technology, J.H. Saunders and K.C. Frisch, Part 1, (date unavailable) pp. 48-53, "Polyurethanes" (1992).
Paintindia, Feb. 2002, pp. 29, 30 and 32, S.K. Shukla et al, "CNSL-derived polymers for use in surface coatings".
J.M.S. Rev. Macromol. Chem. Phys., C40(1), (month unavailable) 2000, pp. 12-18, Padma L. Nayak, Natural Oil-Based Polymers: Opportunities and Challenges, "Cashew Nutshell Liquid".
Stabilization of Polymeric Materials, (month unavailable) 1977, pp. 181-213, Hans Zweifel, "Appendix 3".
Kunststoff Handbuch 7, Polyurethane, (month unavailable) 1984, pp. 97-98, "Katalysatoren für die NCO/PH-Reaktion".
Database WPI Section Ch, Week 197377 Derwent Publications Ltd., London, GB; AN 1973-54484U XP002324011 & JP 48 02953 B (Cashew KK) Sep. 11, 1973.

* cited by examiner

*Primary Examiner*—John Cooney
(74) *Attorney, Agent, or Firm*—Noland J. Cheung; Robert S. Klemz

(57) ABSTRACT

A process for preparing hydrophobic polyols that includes reacting A) a mixture having an OH content of from 180 to 300 mg KOH/g, a viscosity at 23° C. of from 5000 to 20 000 mPas and an OH functionality of from 2.8 to 4.5 including from 5 to 20 wt. % of 3-pentadecadienylphenol, from 5 to 10 wt. % of 3-pentadecadienyl-recorcinol and from 1 to 5 wt. % of 2-methyl 3-pentadecadienylrecorcinol; with B) alkylene oxides (AO) with addition of the AO monomers onto the AO-reactive groups of component A); the ratio of the amounts of A) to B) being from 1:9 to 9:1; where the hydrophobic polyols have an OH number of from 140 to 220 mg KOH/g and a viscosity at 23° C. of from 1000 to 4000 mPas. The hydrophobic polyols can be used in polyurethane systems, in coatings, adhesive bonds, sealants or moulding compounds, which can be used to coat substrates.

19 Claims, No Drawings

HYDROPHOBIC POLYOLS OF LOW VISCOSITY

CROSS REFERENCE TO RELATED PATENT APPLICATION

The present patent application claims the right of priority under 35 U.S.C. §119 (a)-(d) of German Patent Application No.10 2004 009 818, filed Feb. 28, 2004.

BACKGROUND OF THE INVENTION

1. Field of the Invention

The invention relates to new hydrophobic polyols of low viscosity, to a process for preparing them and to solvent-free binder mixtures based thereon which are especially suitable for primers of floor coatings.

2. Description of the Prior Art

Prior-art solvent-free two-component (2K) coating systems divide essentially into epoxy resin (2K EP) systems and polyurethane (2K PU) systems.

Coatings based on 2K EP systems combine good mechanical strength with high resistance to solvents and chemicals. Additionally they are distinguished by very good substrate adhesion. A distinct disadvantage is their poor elasticity, particularly at low temperatures. This brittleness results in poor crack bridging by the coating, so that an attack may take place here on the substrate. An additional disadvantage is the very low resistance to organic acids. This is a problem above all for applications in the food sector, since in that sector organic acids are often released as waste products.

A balanced combination of hardness and elasticity, on the other hand, is the outstanding property of the 2K PU coatings and the greatest advantage over 2K EP coatings. With similar solvent and chemical resistances, moreover, the resistance to organic acids of 2K PU coatings is substantially better than that of 2K EP coatings.

For environmental reasons coating compositions ought to be solvent free, particularly in the case of high-build applications, such as floor coatings, for example. This means that the inherent viscosity of the binder component ought to be low.

In the case of high-build applications on the basis of 2K PU systems there is a risk of bubbles forming through the formation of $CO_2$ as a consequence of the water-isocyanate reaction. Therefore it is important that the raw materials exhibit very low water absorption, so that such coatings can be applied without bubbles even under damp conditions. Since the hydroxy-functional component is generally more hydrophilic than the polyisocyanate component, it is particularly important to use hydroxy-functional components that are hydrophobic, specifically.

The hydroxy-functional binder component of the 2K PU coating may be constructed on the basis of a variety of types of chemical structure.

Whereas polyester polyols are distinguished by a low viscosity and relatively low water absorption, their stability to hydrolysis is low, thereby severely restricting their usefulness for the corrosion protection of metallic substrates and also for the coating of mineral (alkaline) substrates.

2K PU coatings based on polyacrylate polyols are distinguished by effective resistance to hydrolysis, but a disadvantage is their relatively high viscosity. Accordingly either solvents or reactive diluents such as polyether polyols or polyfunctional alcohols are always added to adjust the viscosity. In the same way as when polyether polyols are used alone as crosslinkers, this generally has the effect of increasing the water absorption behaviour.

Solvent-free polyols are often made sufficiently hydrophobic in the prior art by, using castor oil (e.g. Saunders, Frisch; Polyurethanes, Chemistry and Technology, Part 1 Chemistry pages 48 to 53). The 2K PU coatings produced therewith, however, are not stable to hydrolysis.

Resins derived from cashew nut shell liquid (CNSL; cashew nut shell oil) are used for paints and coatings (Shukla et al., in Paintindia, February 2002, pages 29-32, Nayak, Natural Oil-Based Polymers: Opportunities and Challenges, in J.M.S.—Rev. Macromol. Chem. Phys., C40(1), 12-18, 2000). Such products are very hydrophobic and because of the absence of ester bonds they are stable to hydrolysis. CNSL-based resins contain phenolic OH groups, which can be utilized for crosslinking by reaction with polyisocyanates. A disadvantage here, however, is that the phenol-based urethane bonds formed are not stable to re-cleavage under damp, alkaline conditions.

J48-29530 describes the reaction of CNSL-aldehyde or cardanol-aldehyde condensates with alkylene oxides such as propylene oxide, the phenolic OH groups becoming aliphatically attached hydroxyl groups. A disadvantage of these products is the fact that the viscosity is relatively high and that the addition of solvents is necessary for processability.

An object of the present invention was therefore to provide a hydrophobic, low-viscosity polyol component which can be further processed to solvent-free binder mixtures and which does not exhibit the aforementioned disadvantages of lack of resistance of the coatings based thereon, especially in the field of high-build applications.

SUMMARY OF THE INVENTION

The present invention is directed to a process for preparing hydrophobic polyols that includes reacting A) a mixture having an OH content of from 180 to 300 mg KOH/g,
  a viscosity at 23° C. of from 5000 to 20 000 mPas and an average OH functionality of from 2.8 to 4.5 and, further, including from 5 to 20% by weight of cardanol (3-pentadecadienylphenol), from 5 to 10% by weight of cardol (3-pentadecadienylrecorcinol) and from 1 to 5% by weight of 6-methylcardol (2-methyl 3-pentadecadienylrecorcinol)

with

B) alkylene oxides (AO) with addition of the AO monomers onto the AO-reactive groups of component A),
  the ratio of the amounts of A) to B) being from 1:9 to 9:1;
  where the hydrophobic polyols have an OH number of from 140 to 220 mg KOH/g and a viscosity at 23° C. of from 1000 to 4000 mPas.

The present invention also provides hydrophobic polyols obtained according to the above-described process.

The present invention additionally provides polyurethane (PU) systems that include a)one or more of the above-described hydrophobic polyols b) one or more polyisocyanates.

The present invention is further directed to coatings, adhesive bonds, sealants or moulding compounds obtained using the above-described hydrophobic polyols as well as substrates coated with such coatings.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that alkylene oxide adducts with cardanol-depleted CNSL of defined composition have the required polyol properties.

The invention provides a process for preparing hydrophobic polyols having an OH number of from 140 to 220 mg KOH/g and a viscosity at 23° C. of from 1000 to 4000 mPas, wherein A) a mixture having
  an OH content of from 180 to 300 mg KOH/g,
  a viscosity at 23° C. of from 5000 to 20 000 mPas and
  an average OH functionality of from 2.8 to 4.5 and, further, comprising
    from 5 to 20% by weight of cardanol (3-pentadecadienylphenol),
    from 5 to 10% by weight of cardol (3-pentadecadienylrecorcinol) and
    from 1 to 5% by weight of 6-methylcardol (2-methyl 3-pentadecadienylrecorcinol)

is reacted with

B) alkylene oxides (AO) with addition of the AO monomers onto the AO-reactive groups of component A),
  the ratio of the amounts of A) to B) being from 1:9 to 9:1 and the amounts of cardanol, cardol and 6-methylcardol adding up, with the remaining constituents of component A), to 100% by weight.

Additionally the polyols prepared by the process essential to the invention are provided by the present invention.

Industrially cardanol (3-pentadecadienylphenol) is obtained from shells of cashew nut kernels and/or from the CNSL contained therein.

The CNSL is extracted from the layer between the nut and shell of the cashew nut. This interlayer contains predominantly anacardic acid (2-carboxy-3-pentadecadienylphenol) and related acids having different double-bond contents, and also cardol (m-pentadecadienylresorcinol). The liquid is extracted from the interlayer by heating, in the course of which the acids are decarboxylated. The products thus obtained comprise cardanol (I), cardol (II) and related compounds having different numbers of double bonds. A typical composition of such an extract is as follows:

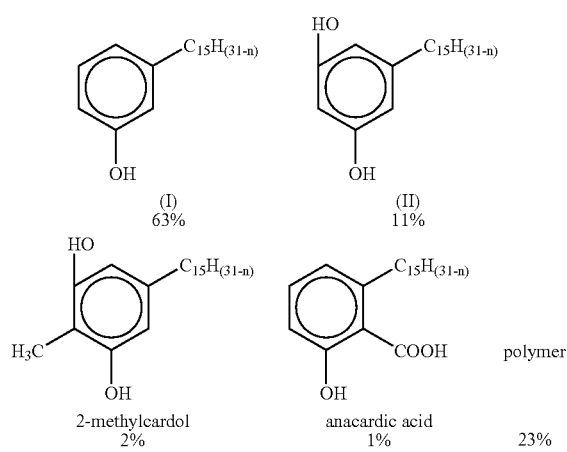

The side chains, which are saturated or cis-unsaturated, may undergo further reaction, by polymerization, to form higher molecular mass compounds ("polymer").

Cardanol, finally, is isolated from CNSL by distillation. The residue which remains contains not only higher molecular mass organic compounds but typically also from 5 to 20% by weight of cardanol residues and from 5 to 10% by weight of cardol (3-pentadecadienylrecorcinol) and from 1 to 5% by weight of 6-methylcardol (2-methyl 3-pentadecadienylrecorcinol).

It is preferred in A) to use such a residue from the preparation of cardanol starting from cashew nut shell liquid (CNSL). This residue contains the stated amounts of cardanol, cardol and 6-methylcardol and also typically from 60 to 80% by weight, preferably from 65 to 75% by weight, of possibly phenolic OH-functional organic compounds with a number-average molecular weight $M_n$>700 g/mol, the amounts of the stated constituents of the residue employed adding up to 100% by weight.

Preferably the mixture of component A) has an OH content of from 200 to 270 mg KOH/g.

Preferably the mixture of component A) has a viscosity at 23° C. of from 5000 to 20 000 mPas and preferably an average OH functionality of from 3 to 4.

Residues of this kind from cardanol preparation are obtainable from Cardolite Chemical N.V., Belgium under the designation NX-4670. They have an OH content of from 207 to 250 mg KOH/g and a viscosity at 23° C. of from 5000 to 20 000 mPas.

Preferably in the process of the invention the ratio of the amounts of A) to B) is from 1:5 to 5:1.

The alkoxylation of component A) takes place by polyaddition of the compounds of component B) onto groups of component A) that contain active hydrogen atoms.

Alkylene oxides employed are preferably ethylene oxide, propylene oxide, butylene oxide and mixtures thereof. When two or more alkylene oxide types are employed they may undergo blockwise or random polyaddition. Further details can be found in "Ullmanns Encyclopädie der industriellen Chemie", volume A21, 1992, p. 670f.

The polyaddition reaction can be carried out catalyst-free or using a catalyst. Suitable for this purpose are the catalyst systems and compounds known per se to the skilled person, such as, for example, alkali metal hydroxides or double-metal cyanide catalysts (DMC catalysts).

The procedure for polyaddition of alkylene oxides onto compounds containing active hydrogens is familiar to the skilled person. Typically component A) is introduced initially and component B) is added with polyaddition.

The process of the invention is generally conducted at temperatures from 20 to 200° C., preferably from 40 to 180° C., more preferably from 50 to 150° C. The reaction can be conducted at overall pressures of from 0.001 to 20 bar. The polyaddition can be carried out continuously or discontinuously, for example in a batch or semibatch process.

The polyols obtainable for the process of the invention preferably have a viscosity at 23° C. of from 1000 to 3500 mPas and an OH number of from 150 to 220 mg KOH/g.

The polyols of the invention that are obtainable in this way are distinguished by particularly high hydrophobicity. They are therefore especially suitable for preparing 2-K polyurethane coating systems (2-K PU systems) for high-build applications, in the building sector, for example., The present invention hence further provides polyurethane systems (PU systems), preferably 2K PU systems, at least comprising
  a) one or more of the polyols of the invention and also
  b) one or more polyisocyanates.

Polyisocyanates of component b) that are used are typically organic polyisocyanates having an average NCO functionality of at least 2 and a molecular weight of at least 140 g/mol. Particularly suitable are (i) unmodified organic, polyisocyanates of the molecular weight range 140 to 300 g/mol, (ii) paint polyisocyanates of a molecular weight in the range from 300 to 1000 g/mol, and (iii) NCO prepolymers containing urethane groups and of a molecular weight of more than 1000 g/mol, or mixtures of (i) to (iii).

Examples of polyisocyanates of group (i) are 1,4-diisocyanatobutane, 1,6-diisocyanatohexane (HDI), 1,5-diisocyanato-2,2-dimethylpentane, 2,2,4- and 2,4,4-trimethyl-1,6-diisocyanatohexane, 1-isocyanato-3,3,5-trimethyl-5-isocyanatomethylcyclohexane (IPDI), 1-isocyanato-1-methyl-4-(3)-isocyanatomethylcyclohexane, bis-(4-isocyanatocyclohexyl)methane, 1,10-diisocyanatodecane, 1,12-diisocyanatododecane, cyclohexane 1,3- and 1,4-diisocyanate, xylylene diisocyanate isomers, triisocyanatononane (TIN), 2,4-diisocyanatotoluene or its mixtures with 2,6-diisocyanatotoluene, containing preferably, based on mixtures, up to 35% by weight of 2,6-diisocyanatotoluene 2,2'-, 2,4'-, 4,4'-, diisocyanatodiphenylmethane or technical polyisocyanate mixtures of the diphenylmethane series or any desired mixtures of the stated isocyanates. Preference is given here to employing the polyisocyanates of the diphenylmethane series, more preferably in the form of isomer mixtures.

Polyisocyanates of group (ii) are the paint polyisocyanates known per se. The term "paint polyisocyanates" refers in the context of the invention to compounds or mixtures of compounds which are obtained by conventional oligomerization reaction of simple diisocyanates of the type exemplified under (i). Examples of suitable oligomerization reactions include carbodiimidization, dimerization, trimerization, biuretization, urea formation, urethanization, allophanatization and/or cyclization with the formation of oxadiazine structures. In the course of "oligomerization" it is often the case that two or more of the reactions stated run simultaneously or in succession.

The "paint polyisocyanates" (ii) are preferably biuret polyisocyanates, polyisocyanates containing isocyanurate groups, polyisocyanate mixtures containing isocyanurate and uretdione groups, polyisocyanates containing urethane and/or allophanate groups, or polyisocyanate mixtures containing isocyanurate and allophanate groups and based on simple diisocyanates.

The preparation of paint polyisocyanates of this kind is known and is described for example in DE-A 1 595 273, DE-A 3 700 209 and DE-A 3 900 053 or in EP-A-0 330 966, EP-A 0 259 233, EP-A-0 377 177, EP-A-0 496 208, EP-A-0 524 501 or U.S. Pat. No. 4,385,171.

Polyisocyanates of group (iii) are the conventional isocyanato-functional prepolymers based on simple diisocyanates of the type exemplified above and/or based on paint polyisocyanates (ii) on the one hand and organic polyhydroxy compounds of a molecular weight of more than 300 g/mol on the other hand. Whereas the paint polyisocyanates of group (ii) which contain urethane groups are derivatives of low molecular mass polyols of the molecular weight range 62 to 300 g/mol, (suitable polyols are for example ethylene glycol, propylene glycol, trimethylolpropane, glycerol or mixtures of these alcohols), the NCO prepolymers of group (iii) are prepared using polyhydroxyl compounds of a molecular weight $M_n$ of more than 300 g/mol, preferably more than 500 g/mol, more preferably from 500 to 8000 g/mol. Particular such polyhydroxyl compounds of this kind are those which contain from 2 to 6, preferably from 2 to 3, hydroxyl groups per molecule and are selected from the group consisting of ether, ester, thioether, carbonate and polyacrylate poloyols and mixtures of such polyols.

In the preparation of the NCO prepolymers (iii) it is possible for the relatively high molecular mass polyols stated to be employed in blends with the low molecular mass polyols stated, so leading directly to mixtures of low molecular mass paint polyisocyanates (ii) containing urethane groups and relatively high molecular mass NCO prepolymers (iii).

In order to prepare the NCO prepolymers (iii) or mixtures thereof with the paint polyisocyanates (ii), diisocyanates (i) of the type exemplified above or paint polyisocyanates of the type exemplified above under (ii) are reacted with the relatively high molecular mass hydroxyl compounds or mixtures thereof with low molecular mass polyhydroxyl compounds of the type exemplified, observing an NCO/OH equivalent ratio of from 1.1:1 to 40: 1, preferably from 2:1 to 25:1, with formation of urethane. Optionally, using an excess of distillable starting diisocyanate, it is possible to remove this diisocyanate by distillation following the reaction, so that monomer-free NCO prepolymers, i.e. mixtures of starting diisocyanates (i) and true NCO prepolymers (iii).

The polyisocyanates stated are preferably employed in unblocked form, so that 2K PU systems are obtained. Also possible, alternatively, is the use of blocking agents to block the NCO groups of the aforementioned polyisocyanates, so that they can be formulated with the polyols essential to the invention to give storage-stable 1K PU systems.

In the PU systems of the invention the amounts of components a), b) and optionally further constituents are chosen so as to given an NCO:OH equivalent ratio of from 0.5:1 to 2.0:1, preferably from 0.8:1 to 1.5:1.

In addition to a) and b), the PU systems of the invention may comprise further constituents such as additional polyols of higher or low molecular mass, catalysts or auxiliaries and additives.

As catalysts it is possible to use the compounds known per se in polyurethane chemistry for accelerating the NCO/OH reaction (cf. "Kunststoff Handbuch 7, Polyurethane" Carl-Hanser-Verlag, Munich—Vienna, 1984, pp. 97-98).

These may include, for example, the following: tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc 2-ethylcaproate, tin(II) octoate, tin(II) ethylcaproate, tin(II) palmitate, dibutyltin(IV) dilaurate and molybdenum glycolate or any desired mixtures of such catalysts. Preference is given to using tin compounds as compounds of component C).

Examples of auxiliaries or additives which may be used in the PU systems include surface-active substances, internal release agents, fillers, dyes, pigments, flame retardants, hydrolysis preventatives, microbicides, levelling assistants, antioxidants such as 2,6-di-tert-butyl-4-methylphenol, UV absorbers of the 2-hydroxyphenylbenzotriazole type or light stabilizers of the type of the HALS compounds unsubstituted or substituted on the nitrogen atom, such as Tinuvin® 292 and Tinuvin® 770 DF (Ciba Spezialitäten GmbH, Lampertheim, DE) or other commercially customary stabilizers, as described for example in "Lichtschutzmittel für Lacke" (A. Valet, Vincentz Verlag, Hanover, 1996 and "Stabilization of Polymeric Materials" (H. Zweifel, Springer Verlag, Berlin, 1997, Appendix 3, pp. 181-213).

To prepare the PU systems of the invention components a), b) and optionally further crosslinker components are mixed with one another so as to give an NCO:OH equivalent ratio of 0.5:1 to 2.0: 1, preferably from 0.8:1 to 1.5:1. During or after this mixing of the individual components it is possible if desired to admix the stated auxiliaries and additives and also catalysts.

The application of the PU systems of the invention may take place by techniques customary per se in the art, such as brushing, knifecoating, spraying and dipping.

The PU systems of the invention are distinguished by their very low water absorption of preferably less than 7% by weight, more preferably less than 4% by weight. To determine the water absorption a sample is stored in the open for 21 days at 23° C. and 97% atmospheric humidity and the weight increase is measured. On the basis of this outstanding quality these systems can also be applied without bubbles and cured, even at high film thicknesses.

Preferred film thicknesses are from 0.5 to 10 mm, preferably from 0.7 to 6 mm, although this does not rule out the production of thinner or thicker layers.

In principle the PU systems of the invention can be used to coat all kinds of materials. Examples that may be mentioned include glass, wood, metal, and mineral substrates such as concrete.

The PU systems are preferably used for producing coatings for protecting metallic substrates against mechanical damage and corrosion and also for protecting mineral substrates, such as concrete, against environmental effects and mechanical damage.

EXAMPLES

Unless indicated otherwise, all percentages are by weight.

The dynamic viscosities were determined in accordance with DIN 53019 at 23° C. using a rotational viscometer (Viscotester 550, Thermo Hakke GmbH, D-76227 Karlsruhe) at a shear rate of 40 s$^{-1}$.

The Shore D hardness was determined in accordance with DIN 53505.

The water absorption was determined by the weight increase of the sample after 21 days of open storage at 23° C. and 97% atmospheric humidity.

The water absorption is calculated according to the following formula:

$$\text{Water absorption (\%)} = \frac{100 \times \text{weight}_{21\,\text{days}} - \text{weight}_{\text{initial}}}{\text{weight}_{\text{initial}}}$$

Cardolite® NX-4670:

By-product from cardanol preparation, containing phenolic OH groups, having an OH number of from 207 to 250 mg KOH/g and a viscosity at 23° C. of from 5000 to 20 000 mPas, Cardolite Chemical N.V., Belgium.

Desmodur® VL:

Polyisocyanate based on 4,4'-diphenylmethane diisocyanate, having an NCO content of 31.5% by weight and a viscosity at 23° C. of 90 mPas, Bayer AG, Leverkusen, DE.

Preparation of Polyol A-I 4000 grams of Cardolite® NX-4670 with a pH of 11 were charged to a 10 litre reactor. The reactor was inertized with nitrogen and heated to 130° C. Subsequently 2000 grams of propylene oxide were added over a period of 4 hours. After the end of reaction the product was cooled and discharged from the reactor. 2000 grams of this product were then mixed with 66.6 g of water and 12% strength sulphuric acid at 80° C. for 60 minutes. Sulphuric acid was added until a pH of 7 was reached. The resultant end product had an OH number of 188 mg KOH/g, a viscosity at 23° C. of 1770 mPas, a pH of 7.1 and a water absorption of 5.1% by weight.

Preparation of Polyol A-II 4800 grams of Cardolite® NX-4670 with a pH of 11 were charged to a 10 litre reactor. The reactor was inertized with nitrogen and heated to 130° C. Subsequently 1200 grams of propylene oxide were added over a period of 4 hours. After the end of reaction the product was cooled and discharged from the reactor. 2000 grams of this product were then mixed with 66.6 g of water and 12% strength sulphuric acid at 80° C. for 60 minutes. Sulphuric acid was added until a pH of 7 was reached. Subsequently the water present was removed by distillation and the product was freed from precipitated salts by filtration using depth filters T 850 from Seitz, DE. The end product had an OH number of 200 mg KOH/g, a viscosity at 23° C. of 1416 mPas, a pH of 6.7 and a water absorption of 3.5% by weight.

Preparation Example Polyol A-III 2000 grams of Cardolite® NX-4670 were mixed with water and neutralized by adding 12% strength sulphuric acid to a pH of 7. Subsequently the water present was removed by distillation and the product was freed from precipitated salts by filtration using depth filters T 850 from Seitz, DE. The end product had an OH number of 250 mg KOH/g, a viscosity of 2099 mPas and a pH of 7.9.

Examples 1 to 3

To prepare the 2-K PU systems of the invention the polyol component was mixed with the polyisocyanate component in an NCO/OH ratio of 1 to 1 and the mixture was applied by pouring to a plastic substrate in a film thickness of 3 to 5 mm. The subsequent curing took place at room temperature.

Examples (1, 2 Inventive, 3 Comparative)

| Composition (% by weight) | 1 | 2 | 3 |
|---|---|---|---|
| Polyol A-1 | 70.2 | | |
| Polyol A-II | | 67.8 | |
| Polyol A-III | | | 63.0 |
| Desmodur ® VL | 30.8 | 32.2 | 37.0 |
| Processing time* (min) | 50 | 65 | — |
| Hardness (Shore D) | 67 | 70 | — |
| Storage at 70° C. in water | | | |
| Test specimen undamaged after | | | |
| 1 d | yes | yes | no |
| 7 d | yes | yes | no |
| 14 d | yes | yes | no |
| Storage at 70° C. in 10% strength sodium hydroxide solution | | | |
| Test specimen undamaged after | | | |
| 1 d | yes | yes | no |
| 7 d | yes | yes | no |
| 14 d | yes | yes | no |

*Time within which the mixture is still fluid and can be processed manually

As Comparative Example 3 shows, without alkoxylation no adequate resistance to damp and alkaline conditions is achieved.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing hydrophobic polyols comprising reacting
   A) a mixture comprising from 5 to 20% by weight of cardanol (3-pentadecadienylphenol), from 5 to 10% by weight of cardol (3-pentadecadienylrecorcinol) and from 1 to 5% by weight of 6-methylcardol (2-methyl 3 pentadecadienylrecorcinal), the mixture having an OH content of from 180 to 300 mg KOH/g, a viscosity at 23° C. of from 5000 to 20 000 mPas and an average OH functionality of from 28 to 4.5, with
   B) one or more alkylene oxides (AO) with addition of the AO monomers onto the AO-reactive groups of component A),
the ratio of the amounts of A) to B) being from 1:9 to 9:1; wherein the hydrophobic polyols have an OH number of from 140 to 220 mg KOH/g and a viscosity at 23° C. of from 1000 to 4000 mPas.

2. The process for preparing hydrophobic polyols according to claim 1, wherein a residue from the production of cardanol starting from CNSL (cashew nut shell liquid) is used in A).

3. The process for preparing hydrophobic polyols according to claim 1, wherein ethylene oxide, propylene oxide, butylene oxide or mixtures thereof are used in B).

4. The process for preparing hydrophobic polyols according to claim 1, wherein the ratio of the amounts of A) to B) is from 1:5 to 5:1.

5. Hydrophobic polyols obtained from the process according to claim 1.

6. Polyurethane (PU) systems comprising
   a) the hydrophobic polyols obtained from the process according to claim 1 and
   b) one or more polyisocyanates.

7. Coatings, adhesive bonds, sealants or moulding compounds obtained using the hydrophobic polyols according to claim 5.

8. Substrates coated with coatings according to claim 7.

9. The process for preparing hydrophobic polyols according to claim 2, wherein ethylene oxide, propylene oxide, butylene oxide or mixtures thereof are used in B).

10. The process for preparing hydrophobic polyols according to claim 2, wherein the ratio of the amounts of A) to B) is from 1:5 to 5:1.

11. Hydrophobic polyols obtained from the process according to claim 2.

12. Polyurethane (PU) systems comprising
    a) the hydrophobic polyols obtained from the process according to claim 2 and
    b) one or more polyisocyanates.

13. Coatings, adhesive bonds, sealants or moulding compounds obtained using the hydrophobic polyols according to claim 11.

14. Substrates coated with coatings according to claim 13.

15. The process for preparing hydrophobic polyols according to claim 3, wherein the ratio of the amounts of A) to B) is from 1:5 to 5:1.

16. Hydrophobic polyols obtained from the process according to claim 3.

17. Polyurethane (PU) systems comprising
    a) the hydrophobic polyols obtained from the process according to claim 3 and
    b) one or more polyisocyanates.

18. Coatings, adhesive bonds, sealants or moulding compounds obtained using the hydrophobic polyols according to claim 16.

19. Substrates coated with coatings according to claim 18.

* * * * *